H. OLSEN,

Assignor to E. RAWLINGS.

OIL SQUEEZER.

No. 7,314. Reissued Sept. 19, 1876.

Witnesses:
Harley Laurie
David Lumgair.

Hans Olsen
Inventor
per Alex
Worthy Feyrolz

N. PETERS, PHOTO-LITHOGRAPHER, WASHINGTON, D. C.

UNITED STATES PATENT OFFICE.

HANS OLSEN, OF MONTREAL, QUEBEC, CANADA, ASSIGNOR TO EDWARD RAWLINGS.

IMPROVEMENT IN OIL-SQUEEZERS.

Specification forming part of Letters Patent No. 174,971, dated March 21, 1876; reissue No. 7,314, dated September 19, 1876; application filed September 7, 1876.

*To all whom it may concern:*

Be it known that I, HANS OLSEN, of the city of Montreal, in the county of Hochelaga and Province of Quebec, Canada, have invented a certain new and useful Improvement in Oil-Squeezers; and I hereby declare that the following specification is a full, clear, and exact description of the same.

I claim for my improvement, which is designed to take the place of the horse-hair bag now in use for extracting the oil from seeds, the following advantages: First, I can produce twenty per cent. more oil from the same amount of seed than can be extracted by the old apparatus. Second, the seed, after the oil is extracted, is left in a better shape for marketable purposes. Third, it is less likely to get out of order, and therefore more durable. Fourth, as the pressure is more direct, and there is no chance to expand at the sides, much time is saved. Fifth, it is much easier to handle; and, sixth, it is much cheaper than the horse hair, or any means yet devised for the purpose.

The object of my invention is to construct two flat pressing-surfaces which shall tightly incase between them the seed to be operated upon, and at the same time yield sufficiently to allow the oil thereby extracted to pass out without the pressure injuring the sides of the squeezer. To attain this object I propose to construct my squeezer of two side pieces, having corrugated inner pressing-surfaces, on either side of each of these being secured a strip of braided horse-hair, through which the oil exudes.

For fuller comprehension, however, of my invention, reference must be had to the annexed drawings forming part of this specification, in which similar letters of reference indicate like parts.

Figure 1:
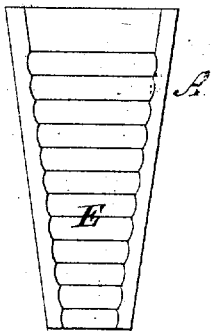
Figure 2:
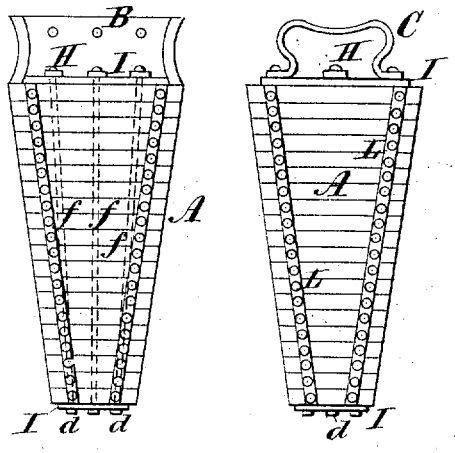

Figure 1 represents the inner face of one of the sides of the squeezer; Fig. 2, the exterior of the two sides; and Fig. 3, a side view of the squeezer complete.

A A show the sides of the squeezer, formed in this case of wood, which should be sufficiently hard and tenacious to stand, without splitting, the heavy pressure brought to bear upon it. These sides may be, as in this case, formed of strips so cut that, when laid side by side, they will present a surface which shall taper toward one end; but it must be, however, clearly understood that I do not confine myself to any particular shape or form of construction, although I have found the one which I describe immediately hereunder to answer very satisfactorily in practical use.

Through the strips forming the sides A A I run iron rods *f f*, passing through the metal strips I placed at either end of these sides A A, these bolts being secured by rivet-bolt nuts H at one end, and by hammering or riveting their ends, as at *d d*, at the other, thus affording means for tightly securing all the strips together in a compact form. Strips of leather, as at L, Fig. 2, may also be secured on the exterior faces of the sides A A, when composed of strips. To the inner side of these strips are secured, in any usual way, plates E of corrugated zinc, tin, or other suitable metal, which form the direct or inner pressing-surfaces. On either side of these surfaces are attached braided strips, G G, of horse-hair, preferably secured by horse hair thongs pegged into the wood in the same way as bristles are into a brush, or any other suitable means may be employed for the purpose. The object of this horse-hair braid is to keep the seed to be operated on in place between the pressing-surfaces of the squeezer, and, being porous, to allow the oil to pass out freely.

Figure 3:
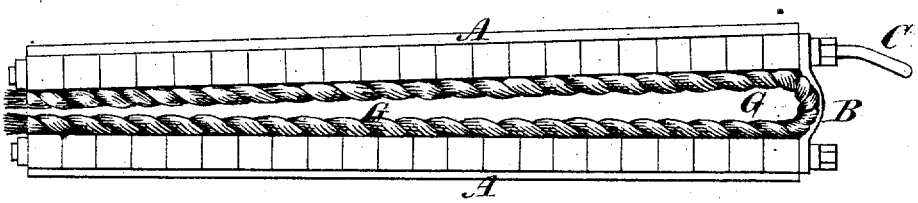

The two sides of the squeezer are, as shown in Fig. 3, secured together by a hinge, B, of leather or other material, and this end of the squeezer is usually provided with a metal or other handle.

Having thus described the construction of my squeezer, I will proceed to set forth its *modus operandi*. The seed to be operated upon is placed between the two sides A, care being taken that only sufficient is introduced to allow of the squeezer being closed when under pressure, so that the edges of the horse-hair braids shall be close to each other, or sufficiently so to prevent the seeds bursting out. The squeezer is then introduced under the press, and, being subjected to pressure, the oil will flow freely from the sides. When the oil is expressed the squeezer is removed from the press and opened, when the seed will be found in a form fit for market.

Having thus described my invention, what I claim is as follows:

An oil-squeezer composed of two corrugated pressing-surfaces, of wood or metal, having on either side of its meeting-faces strips of horse-hair, as herein set forth, and for the purposes described.

Montreal, 30th day of August, A. D. 1376.

HANS OLSEN.

Witnesses:

UNO HILLMAN,

A. S. ISAACSON.